June 28, 1960 R. H. BLACKMER 2,942,598
INTERNAL COMBUSTION ENGINE
Filed Dec. 14, 1956
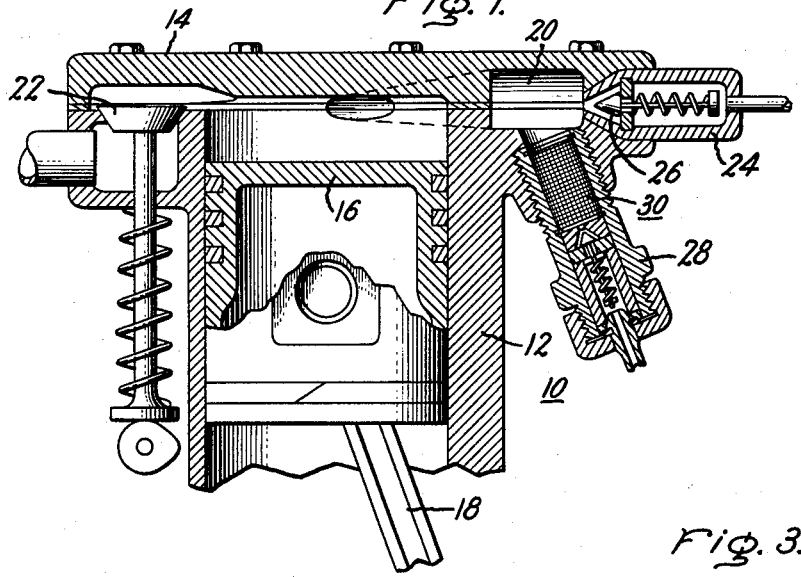
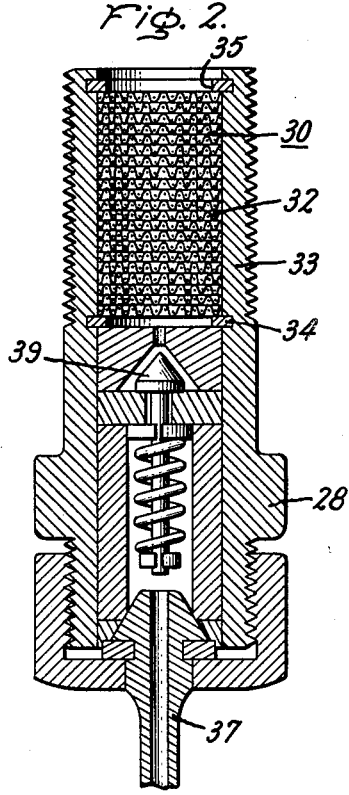
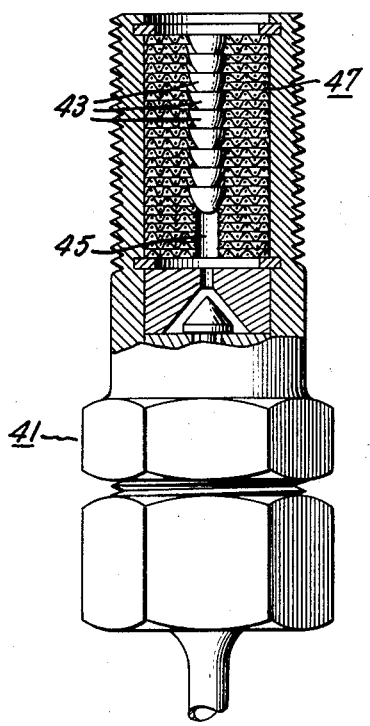
Inventor:
Richard H. Blackmer,
by Roe D McBurnett
His Attorney.

United States Patent Office 2,942,598
Patented June 28, 1960

2,942,598

INTERNAL COMBUSTION ENGINE

Richard H. Blackmer, Schenectady, N.Y., assignor to General Electric Company, a corporation of New York Filed Dec. 14, 1956, Ser. No. 628,952

10 Claims. (Cl. 123—180)

This invention relates generally to internal combustion engines and more particularly to internal combustion engines of the reciprocating type fueled with a hydrocarbon or other oxygen-combustible fuel and supplied with an oxygen liberating composition such as hydrogen peroxide which supplements or completely supplants atmospheric air supply of oxygen for combustion of the fuel.

It has long been recognized that oxygen liberating compositions such as hydrogen peroxide present attractive possibilities for use in internal combustion engines, in an engine cycle in which the peroxide constitutes an oxidizing agent for an oxygen combustible fuel such as a hydrocarbon fuel, alcohol, hydrazine or the like. In normal operation of these known engines, liquid hydrogen peroxide is injected directly into the engine cylinders, the peroxide being immediately thermally decomposed by the hot residual gases compressed therein from the previous engine cycle. A charge of fuel then is injected and combusts with the peroxide decomposition products.

Engines utilizing such fuel-peroxide mixtures offer particular advantage for submarine and torpedo propulsion, extreme altitude aircraft and other applications wherein atmospheric air supply is unavailable or inadequate to meet engine oxygen requirements. In addition to their freedom from reliance on atmospheric air supply, fuel-peroxide engines also afford such desirable operating characteristics as high power-to-weight ratio, low specific fuel consumption, and absence of toxic combustion products, all of which engine characteristics enhance desirability of use in applications such as those just enumerated.

As heretofore constructed, however, these engines have been subject to a very troublesome problem in starting. Since liquid hydrogen peroxide and fuels form mixtures which are very unstable and have great explosive power, direct injection of hydrogen peroxide in undecomposed form into the cold engine at starting is not feasible. The usual practice therefore has been to start the engine on atmospheric air and allow it to thoroughly warm up on a conventional air cycle. Not until the engine has run for a time sufficient for it to reach normal operating temperature can peroxide injection be started and the air intake cut off. Operation in this manner has several obvious drawbacks, among which are the necessity of access to atmospheric air for starting the engine, and the necessary complexity of the various valves and other controls necessary to permit starting on air and switching to peroxide operation after starting.

The present invention has as its principal object the provision of an internal combustion engine of the type described not subject to the foregoing and other disadvantages of prior such engines, and capable of starting without access to atmospheric air supply.

It is also an object of the invention to provide an internal combustion engine utilizing an oxygen combustible fuel and a catalytically decomposable peroxide composition, which engine is capable of cold starting directly on peroxide without danger of formation of explosive mixtures of fuel and undecomposed peroxide.

A further object of the invention is the provision of a one-shot starting device for fuel-peroxide engines particularly adapted to submarine and torpedo propulsion applications.

In carrying out the invention in one form, there is provided a reciprocating internal combustion engine including means for injecting an oxygen combustible fuel into the engine cylinder or cylinders prior to each engine power stroke. In timed relation to this fuel injection, a charge of catalytically decomposable peroxide is fed through a catalytic reactor connected to discharge directly into the cylinder in a manner such that the hot peroxide decomposition products intermix with the injected fuel and initiate combustion thereof. To minimize interference with peroxide flow by the catalytic reactor after the engine has been started and brought up to operating temperature, the reactor comprises means responsive to normal engine operating temperature to be self-destructive to clear a free passage for peroxide flow into the engine after regular fuel combustion has been fully established.

My invention will be more fully understood and its various objects, features and advantages further appreciated by reference to the appended claims and the following detailed specification when read in conjunction with the accompanying drawings, wherein:

Figure 1 is a sectional view of an internal combustion engine incorporating starting means in accordance with the invention;

Figure 2 is a detail view of the peroxide injector assembly in the engine of Figure 1; and Figure 3 is a part sectional view of a modified form of injector tip suitable for use in the engine of Figure 1.

With continued reference to the drawings, wherein like reference numerals have been used throughout to designate like elements, an internal combustion engine in accordance with the invention is designated generally by reference numeral 10 in Figure 1. The cylinder 12, cylinder head 14, piston 16 and connecting rod 18 of the engine 10 all may be of generally conventional configuration except that the cylinder and head preferably are shaped to form a pre-combustion chamber 20 as hereinafter more fully described. The engine exhaust valve 22 may be shown be of conventional cam-actuated poppet type.

An oxygen combustible fuel is supplied to engine 10 by suitable pumping means (not shown) discharging through a fuel injector assembly 24 which may include a spring-loaded check valve 26 of conventional type capable of operation against combustion chamber pressures. The injector 24 is arranged to discharge fuel either directly into the upper end of the engine cylinder or, preferably, into a pre-combustion chamber 20 opening into the cylinder as shown. A second injector assembly 28 serves to inject peroxide into the pre-combustion chamber 20 for supporting combustion of the fuel supplied thereto.

The pre-combustion chamber 20 if used should be constructed and arranged to cause thorough mixing of the fuel and peroxide, to thus assure complete combustion. Such thorough mixing action may be obtained by disposing the peroxide injector off-center with respect to the fuel injector, so that the peroxide enters the pre-combustion chamber tangentially and the fuel is injected down the center of the resultant swirl. In normal operation, the peroxide decomposes on entering the pre-combustion chamber and mixing with the hot residual gases compressed therein from the previous engine cycle, and combustion of the fuel then begins immediately on contact with the peroxide decomposition products.

At starting, however, the liquid peroxide will not immediately decompose if injected directly into the cold engine, but rather will blend with the fuel and engine oil to form a highly explosive mixture. To prevent formation of such explosive mixture, and to utilize the available heat of decomposition of the peroxide for initiating fuel combustion in the engine at starting, catalytic reactor means 30 are provided in the peroxide injector 28 through which the peroxide must pass before entering the precombustion chamber. In accordance with the invention, this reactor 30 is effective to catalytically decompose all peroxide which passes through it even at low temperatures as during engine starting, and is responsive to engine operating temperature after warm-up to be self-destructive to clear a free passage for further flow of peroxide into the engine without interference by the reactor.

This destructive process may involve either chemical destruction by exposure to peroxide, or thermal fusion responsive to the heat of peroxide decomposition and fuel combustion, it being only necessary that sufficient of the screening or other catalytic material be destroyed to provide a clear passage through the reactor. Preferably, however, the reactor material is of heat fusible nature since this permits design of the reactor so as to be sensitive only to normal engine operating temperature and insensitive to contact with peroxide, thus avoiding false starts in which the reactor might respond to peroxide flow and lose its effectiveness before regular fuel combustion has been fully established. Since the decomposition of peroxide also produces heat, the reactor material should have a melting point higher than the temperatures normally produced in the reactor by peroxide decomposition alone. Otherwise the reactor would in effect be responsive to the presence of peroxide, rather than to actual operating temperature of the engine.

The catalytic reactor 30 may as best shown in Figure 2 be disposed directly adjacent the engine combustion chamber, so as to be fully exposed to the heat thereof and to discharge the peroxide decomposition products directly into the combustion chamber without loss of heat. As illustrated the reactor includes a plurality of screens 32 held in stacked relation within the injector nozzle body 33 as by snap rings 34 and 35, these screens 32 being fabricated of a catalytic material which satisfies the requirements hereinbefore explained. Two such materials are the copper-silver alloys known as ASTM-1 and ASTM-6 silver solders, both of which catalytically decompose hydrogen peroxide when contacted therewith and melt at temperatures in the range 1300-1600° F. in which combustion chamber temperatures normally fall. Preferably these catalyst materials are in wire screen form and surface treated with samarium nitrate to improve their catalytic qualities in known manner.

As shown, the peroxide injector assembly 28 further includes an inlet fitting 37 and a check valve 39 for resisting cylinder pressures and preventing backflow in the peroxide supply line. This valve may be of generally conventional construction as shown, except that all its parts are fabricated of materials compatible with the peroxide to minimize corrosion thereby. Among suitable peroxide-resistant materials are a number of soft austenitic stainless steels, such, for example, as that known as AISI Series 300. It will be noted that since the valve design shown includes no sliding bearing surfaces, long service life may be attained despite the use of relatively soft steels in fabricating the valve.

In operation, the cold engine is started simply by injecting fuel charges into the cylinder or pre-combustion chamber and, in timed relation therewith, injecting liquid peroxide through the injector assembly 28. Even at low temperatures, the catalytic reactor unit within the peroxide injector assures immediate decomposition of the peroxide, and the heat of this decomposition provides sufficient thermal energy release (1109 B.t.u./lb. in the case of 90% $H_2O_2$) to initiate combustion of the fuel. At the same time, the possibility of fuel and undecomposed liquid peroxide coming into contact to form an explosive mixture is precluded by decomposition of the peroxide prior to its injection into the engine.

When the engine heats up to a temperature such that thermal decomposition of the peroxide may thereafter be relied upon, the reactor material is self-destructive to clear a free passage for flow of liquid peroxide directly into the engine cylinder or pre-combustion chamber. Peroxide decomposition and fuel ignition then is effected simply by injection of liquid peroxide into the high temperature residual gases within the engine.

While other concentrations may be used, hydrogen peroxide is widely available commercially in 90% solution in water and this concentration has been found fully satisfactory for use in engines operating in accordance with the invention.

Referring now to Figure 3, an alternative form of peroxide injector assembly is illustrated. This injector assembly, designated generally by reference numeral 41, differs from that of Figure 2 primarily in that it includes one or more fusible plug elements 43 which initially close a central passage 45 in the reactor unit 47. Except for this central passage, the reactor unit 47 may be like that of Figure 2 in comprising plural layers of screening of a material effective to catalytically decompose peroxide immediately on contact therewith. Since the reactor unit need not itself fuse, however, other known catalytical materials may be used having melting points too high to permit their use in a reactor of the type illustrated in Figure 2. Examples of such catalytic materials are platinum, in screen or granule form, and cobalt coated iron screening.

The fusible plug elements 43 may be formed of any suitable low melting point metal or alloy, the particular material and geometry of the plug elements being selected to provide the desired melting point and melting rate. Plug elements formed of ASTM-1 or ASTM-6 silver solder and shaped as illustrated in Figure 3 have been found particularly satisfactory for the purpose. The plugs may if made of catalytic material aid the reactor itself in assuring complete peroxide decomposition.

In operation, the fusible plugs 43 melt when engine operating temperature is reached, to thus clear a free passage for unimpeded flow of peroxide through the injector and into the engine. Normally the liquid metal formed by melting of these plugs will be blown out the engine exhaust or flow into and be held in the reactor screening. The plug metal therefore does not in any way interfere with further peroxide flow through the unit.

While a number of specific embodiments of the invention have been shown and described, it is to be understood that various other modifications may be made without departing from the invention. The appended claims are therefore intended to cover all such modifications as fall within the true spirit and scope of the invention.

What is claimed and desired to be secured by Letters Patent is:

1. In combination with an internal combustion engine adapted to operation on an oxygen combustible fuel and a catalytically decomposable peroxide composition and including engine cylinder and piston means together defining a combustion chamber, means for periodically supplying fuel charges to said combustion chamber, peroxide supply means for injecting peroxide charges into said combustion chamber in timed relation to said fuel charges including a catalytic reactor unit operative at engine starting to catalytically decompose said peroxide charges and discharge the decomposition products thereof directly into said combustion chamber, said catalytic reactor unit including means interposed in the path of peroxide flow therethrough responsive to engine temperature to be at least partially self-destructive to clear a substantially free passage through said reactor unit facilitating peroxide flow therethrough after starting of the engine.

2. In combination with an internal combustion engine adapted to operation on an oxygen combustible fuel and a catalytically decomposable peroxide composition and including engine cylinder and piston means together defining a combustion chamber, means for periodically supplying fuel charges to said combustion chamber, peroxide supply means for injecting peroxide charges into said combustion chamber in timed relation to said fuel charges including a catalytic reactor unit open to said combustion chamber and operative at engine starting to catalytically decompose said peroxide charges and discharge the decomposition products thereof directly into said combustion chamber, said catalytic reactor unit including means interposed in the path of peroxide flow therethrough responsive to engine combustion chamber temperature after starting to be at least partially self-destructive to clear a substantially free passage through said reactor facilitating peroxide flow therethrough after starting of the engine.

3. In combination with an internal combustion engine including engine cylinder and piston means together defining a combustion chamber supplied with an oxygen combustible fuel and a catalytically decomposable peroxide composition, means for periodically supplying fuel charges to said combustion chamber, peroxide supply means for injecting peroxide charges into said combustion chamber in timed relation to said fuel charges including injector body means opening directly into said combustion chamber, a catalytic reactor unit disposed in said injector body and including catalyst material operative to catalytically decompose said peroxide charges and discharge the decomposition products thereof directly into said combustion chamber, said catalytic reactor unit being responsive to engine operating temperature after starting to at least partially thermally fuse to clear a substantially free passage through said reactor unit facilitating peroxide flow therethrough after starting.

4. The combination defined in claim 3 wherein said catalyst material is thermally fusible at engine operating temperature after starting.

5. The combination defined in claim 3 wherein said reactor unit includes thermally fusible plug means initially closing an otherwise free passage through the reactor unit.

6. For use with an internal combustion engine including a combustion chamber and means for supplying an oxygen combustible fuel and a catalytically decomposable peroxide composition to said combustion chamber, a one-shot engine starting device comprising a catalytic reactor unit adapted to be connected for flow therethrough of peroxide from said supply means to said combustion chamber and operative at least initially to catalytically decompose the peroxide for discharge of the decomposition products thereof directly into the engine combustion chamber, said reactor unit including means interposed in the path of peroxide flow therethrough responsive to an engine operating condition after starting to be at least partially self-destructive to clear a substantially free passage through said reactor unit facilitating peroxide flow therethrough after starting of the engine.

7. For use with an internal combustion engine including a combustion chamber and means for supplying an oxygen combustible fuel and a catalytically decomposable peroxide composition to said combustion chamber, a one-shot engine starting device comprising a catalytic reactor unit adapted to be connected for flow therethrough of peroxide from said supply means directly into said combustion chamber and operative at least initially to catalytically decompose the peroxide for discharge of the decomposition products thereof directly into the engine combustion chamber, said reactor unit including thermal sensitive means interposed in the path of peroxide flow therethrough responsive to engine combustion chamber temperature to at least partially fuse to clear a substantially free passage through said reactor unit facilitating peroxide flow therethrough after starting of the engine.

8. For use with an internal combustion engine including a combustion chamber and means for supplying an oxygen combustible fuel and a catalytically decomposable peroxide composition to said combustion chamber, a one-shot engine starting device comprising a catalytic reactor unit adapted to be connected for flow therethrough of peroxide from said supply means to said combustion chamber and containing catalyst material operative initially to catalytically decompose the peroxide for discharge of the decomposition products thereof directly into the engine combustion chamber, said catalyst material being responsive to engine operating temperature after starting to at least partially thermally fuse to clear a substantially free passage through said reactor unit facilitating peroxide flow therethrough after starting of the engine.

9. For use with an internal combustion engine including a combustion chamber and means for supplying an oxygen combustible fuel and a catalytically decomposable peroxide composition to said combustion chamber, a one-shot engine starting device comprising a catalytic reactor unit adapted to be connected for flow therethrough of peroxide from said supply means to said combustion chamber and operative at least initially to catalytically decompose the peroxide for discharge of the decomposition products thereof directly into the engine combustion chamber, said reactor unit including thermally fusible plug means closing an otherwise free passage through the reactor unit and responsive to engine operating temperature after starting to at least partially fuse to clear said passage for free peroxide flow therethrough after starting of the engine.

10. For use with an internal combustion engine including a combustion chamber and means for supplying an oxygen combustible fuel and a catalytically decomposable peroxide composition to said combustion chamber, an engine starting device comprising a catalytic reactor unit adapted to be connected for flow therethrough of peroxide from said supply means to said combustion chamber and operative at least initially to catalytically decompose the peroxide for discharge of the decomposition products thereof into the engine combustion chamber, said reactor unit including means initially closing an otherwise free passage through the reactor unit and responsive to thermal condition after starting to clear said passage for free peroxide flow therethrough.

References Cited in the file of this patent

UNITED STATES PATENTS

| | | |
|---|---|---|
| 2,746,249 | Bichowsky et al. | May 23, 1956 |
| 2,775,961 | Petre | Jan. 1, 1957 |